(12) United States Patent
McQuade

(10) Patent No.: US 7,589,617 B2
(45) Date of Patent: Sep. 15, 2009

(54) RADIO FREQUENCY IDENTIFICATION PACKAGING SYSTEM

(75) Inventor: Michael John McQuade, Mattapoisett, MA (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 0 days.

(21) Appl. No.: 11/265,494

(22) Filed: Nov. 2, 2005

(65) Prior Publication Data
US 2006/0125653 A1    Jun. 15, 2006

Related U.S. Application Data

(60) Provisional application No. 60/624,422, filed on Nov. 2, 2004.

(51) Int. Cl.
*H04Q 5/22* (2006.01)
(52) U.S. Cl. .................. 340/10.1; 235/385; 340/572.7; 700/225
(58) Field of Classification Search .............. 340/572.1, 340/572.7, 10.1; 700/115, 225; 705/28; 235/385
See application file for complete search history.

(56) References Cited

U.S. PATENT DOCUMENTS

| 6,496,806 B1* | 12/2002 | Horwitz et al. ............... 705/28 |
| 2002/0119770 A1* | 8/2002 | Twitchell, Jr. ............... 455/422 |
| 2006/0049250 A1* | 3/2006 | Sullivan .................. 340/572.1 |
| 2006/0131405 A1* | 6/2006 | Schneider ................ 340/572.7 |
| 2006/0187041 A1* | 8/2006 | Olsen et al. .............. 340/572.1 |

\* cited by examiner

*Primary Examiner*—Thomas J Mullen

(57) ABSTRACT

Systems and methods for a radio frequency identification packaging system are described. A packaging system may include a rotating member to rotate during packaging of a load and a reader to read item information associated with the load during rotation of the rotating member. Other embodiments are described and claimed.

14 Claims, 4 Drawing Sheets

RADIO FREQUENCY IDENTIFICATION PACKAGING SYSTEM

This application claims the priority benefit of U.S. Provisional Patent Application Ser. No. 60/624,422, which was filed on Nov. 2, 2004 and is incorporated by reference for all purposes in its entirety.

BACKGROUND

Radio frequency identification (RFID) systems are capable of wirelessly transmitting and receiving information associated with an item, such as a unique identity. A typical RFID system may include a reader for retrieving data from a tag that is affixed to an item. The tag may include a microchip that stores digital information and a radio antenna that enables the tag to transmit and receive data. When employed in a commercial setting, tags may be placed on packages, cases, and pallets of inventory items. Accordingly, there may be a need for improved techniques for retrieving RFID information implemented by a system or within a network.

DETAILED DESCRIPTION

Figure 1:
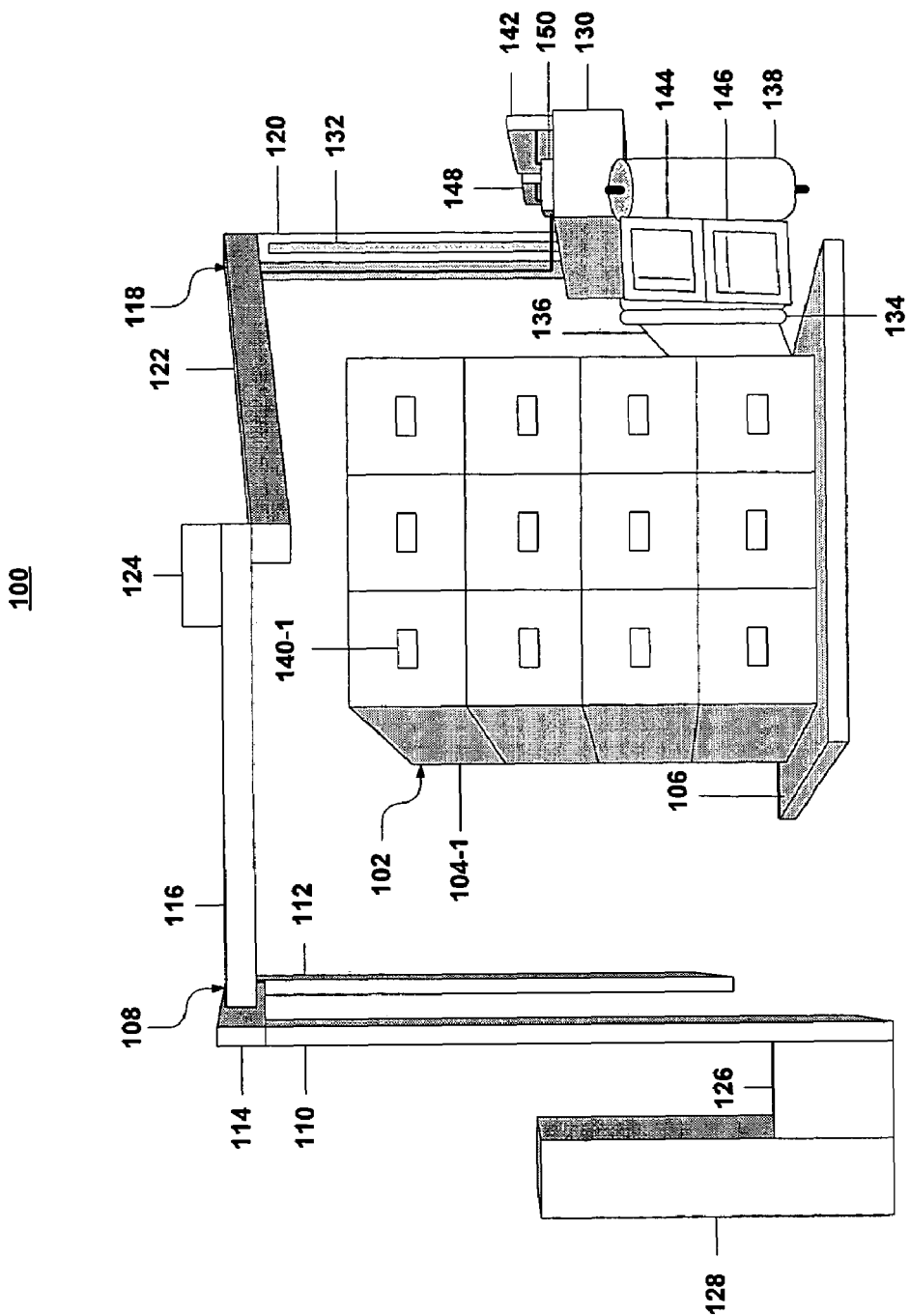
FIG. 1 illustrates a system in accordance with one embodiment.

FIG. 1 illustrates a block diagram of a system 100. In various embodiments, the system 100 may comprise a packaging system arranged to wrap a load with packaging material. In various implementations, the system 100 may comprise a semi-automatic packaging system requiring one or more manual operations, such as attaching packaging material to the load, or may comprise an automatic packaging system requiring no manual packaging operations. The embodiments are not limited in this context.

In various embodiments, the packaging material may comprise stretch wrap packaging material such as polyolefin plastic, for example. When wrapped around a load and stretched, the elastic properties of stretch wrap material may secure the load. In some embodiments, the packaging material may comprise shrink wrap packaging material such as polyvinyl chloride, polyethylene, or polyolefin plastic, for example. When wrapped around load and heated, the heat-shrinking properties of shrink wrap material may secure the load. Other examples of packaging material include, but are not limited to, polymer films, plastics, paper, tape, webbing, netting, banding, strapping, or any other type of wrapping. The embodiments are not limited in this context.

In various embodiments, the system 100 may package a load 102 comprising one or more items, such as item 104-1. In general, the item 104-1 may comprise any article, product, merchandise, composition, component, consumable, container, package, case, batch, shipment, or any other item. In some implementations, one or more items, such as item 102-1, may be positioned on a pallet 106. Although a limited number of items are shown by way of example, it can be appreciated that more or less items may be used for a given implementation. The embodiments are not limited in this context.

In various embodiments, the system 100 may comprise a support structure or frame 108. As shown in FIG. 1, for example, the frame 108 may comprise one or more support members, such as a first vertical support member 110 connected to a second vertical support member 112 by a first horizontal support member 114, and a second horizontal support member 116 connected to the first horizontal support member 114. Although a particular configuration of the frame 108 is shown by way of example, it can be appreciated that various configurations may be used for a given implementation. The embodiments are not limited in this context.

In various embodiments, the system 100 may comprise a rotating member 118. As shown in FIG. 1, for example, the rotating member 118 may comprise a rotating arm 120 connected to a rotating support member 122. In various implementations, the rotating arm 120 may be arranged to rotate around the load 102. For example, the rotating arm 120 may travel in a clockwise direction or in a counter-clockwise direction around the load 102. The embodiments are not limited in this context.

In various embodiments, the system 100 may comprise a motor 124. As shown in FIG. 1, for example, a motor 124 may be mounted to the frame 108. In various implementations, the motor 124 may drive the rotating arm 120 around the load 102 by rotating the support member 122 about an axis of rotation. The embodiments are not limited in this context.

In various embodiments, the system 100 may comprise a power source 126. In various implementations, the power source 126 may be arranged to supply power to one or more elements of the system 100. In one embodiment, for example, the power source 126 may comprise a 400 V AC power source for operating the motor 124. The embodiments are not limited in this context.

In various embodiments, the system 100 may comprise a controller 128. As shown, in FIG. 1, for example, the system 100 may comprise a stand-alone controller 128. In various implementations, the controller 128 may be arranged to direct the operations of the motor 124. The embodiments are not limited in this context.

In various embodiments, the controller 128 may comprise any physical or logical entity for communicating information in the system 100 and may be implemented as hardware, software, or any combination thereof, as desired for a given set of design parameters or performance constraints. The controller 128 may comprise, or be implemented as, a computer system, a computer sub-system, a computer, a workstation, a terminal, a server, a personal computer (PC), a laptop, an ultra-laptop, a handheld computer, a personal digital assistant (PDA), a set top box (STB), a telephone, a cellular telephone, a handset, an interface, an input/output (I/O) device (e.g., keyboard, mouse, display, printer), a router, a hub, a gateway, a bridge, a switch, a microprocessor, an integrated circuit, a programmable logic device (PLD), a digital signal processor (DSP), a processor, a circuit, a logic gate, a register, a microprocessor, an integrated circuit, a semiconductor device, a chip, a transistor, or any other device, machine, tool, equipment, component, or combination thereof. The embodiments are not limited in this context.

In various embodiments, the controller 128 may comprise, or be implemented as, software, a software module, an application, a program, a subroutine, an instruction set, computing code, words, values, symbols or combination thereof. The controller 128 may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, micro-code for a network processor, and so forth. The embodiments are not limited in this context.

In various embodiments, the rotating member 118 may comprise a carriage 130. As shown in FIG. 1, for example, the rotating member 118 may comprise a carriage 130 mounted to the rotating arm 120. In various implementations, the carriage 130 may be arranged to move in a vertical direction with respect to the load 102 by engaging a slot 132 in the rotating arm 120. The embodiments are not limited in this context.

In various embodiments, the carriage 130 may comprise a dispenser 134. As shown in FIG. 1, for example, a dispenser 134 may be mounted to the carriage 130 and may be arranged to dispense packaging material 136 from a roll 138. In various implementations, the packaging material 136 may be attached to the load 102, and the rotating arm 120 may rotate around the load 102. As the rotating arm 120 and carriage 130 travel around the load 102, the dispenser 134 may feed packaging material 136 to wrap the load 102. The carriage 130 also may move vertically along the rotating arm 120 to wrap upper portions of the load 102. The embodiments are not limited in this context.

In various embodiments, the system 100 may comprise a communication system arranged to communicate information associated with the load 102. The communication system may be implemented as a wired communication system, a wireless communication system, or a combination of both.

When implemented as a wireless system, for example, a system may include one or more wireless nodes arranged to communicate information over one or more types of wireless communication media. An example of a wireless communication media may include portions of a wireless spectrum, such as the radio-frequency (RF) spectrum radio frequencies and so forth. The wireless nodes may include components and interfaces suitable for communicating information signals over the designated wireless spectrum, such as one or more antennas, wireless transmitters/receivers ("transceivers"), amplifiers, filters, control logic, and so forth. As used herein, the term "transceiver" may be used in a very general sense to include a transmitter, a receiver, or a combination of both. The embodiments are not limited in this context.

When implemented as a wired system, for example, a system may include one or more nodes arranged to communicate information over one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

In various implementations, the system 100 may be arranged to communicate different types of item information, such as data representing RFID information, bar code information, label information, text information, numerical and alphanumerical information, symbols, or other content. The item information may take the form of analog or digital signals, electrical signals, a sequence of bits or bytes, for example, among other forms of information, formatted to exchange information between electrical equipment, processors, and/or computers located at nodes. The embodiments are not limited in this context.

In various embodiments, the system 100 may comprise one or more RFID tags, such as RFID tag 140-1, for example. As shown in FIG. 1, the RFID tag 140-1 may be associated with one or more items, such as item 104-1. In various implementations, the RFID tag 140-1 may be affixed to, embedded within, or form an integral part of the item 104-1. The RFID tag 104-1 may comprise multiple elements some of which may be implemented using, for example, a variety of chip architectures including one or more circuits, components, registers, processors, software subroutines, or any combination thereof. In various implementations, the RFID tag 140-1 may be ultra high frequency (UHF), Microwave Frequency ($\mu$W), or high frequency (HF). The embodiments are not limited in this context.

In various embodiments, the RFID tag 140-1 may comprise an integrated circuit (IC). The IC may comprise a semiconductor IC that includes an RF circuit, logic, and memory. The RF circuit may comprise, for example, RF transmitter and receiver portions, each comprising a collection of discrete components such as, capacitors, transistors, and diodes that may be located on or off of the IC. Logic may comprise, for example, a processor, controller, state machine, programmable logic array, and the like, and may operate under the control of program instructions. Memory may comprise, for example, program memory, data memory or any combination thereof. Memory also may comprise, for example, random access memory (RAM), read only memory (ROM), programmable read only memory (PROM), erasable programmable read only memory (EPROM), electrically erasable programmable read only memory (EEPROM), re-writable memory, combinations thereof, and the like. The embodiments are not limited in this context.

In various embodiments, the RFID tag 140-1 may comprise an antenna connected to the IC. Examples of an antenna may include an internal antenna, an omni-directional antenna, a monopole antenna, a dipole antenna, a lead-frame antenna, an end-fed antenna, a linear polarized antenna, a circular polarized antenna, a patch antenna, a plane-inverted F antenna, a micro-strip antenna, a diversity antenna, a dual antenna, an antenna array, a helical antenna, and so forth. The embodiments are not limited in this context.

In various embodiments, the RFID tag 140-1 may comprise an active or a passive RFID tag. An active RFID tag may comprise and derive energy from a battery. A passive RFID tag does not include a battery and may derive energy from a RF signal used to interrogate the RFID tag. For example, a passive RFID tag may derive and store voltage from a reactive circuit that is responsive to an RF interrogation signal. The reactive circuit may comprise, for example, an inductive coil, rectifying circuitry, a storage capacitor, and related circuitry permitting the RFID tag to respond to an interrogation signal while present in the electromagnetic field of the interrogation signal. The embodiments are not limited in this context.

In various embodiments, the RFID tag 140-1 may comprise item information. For example, the RFID tag 140-1 may store item information in memory. Item information may comprise, for example, item identification such as an RFID code. The item information may comprise details such as, for example: serial number, model number, part number, lot number, type, quantity, cost, price, manufacturer, supplier, distributor, buyer, manufacture date, shipping date, expiration date, service date, payment information, warranty period, security information, or other details. Item information may comprise encoded numeric or alphanumeric data associated with a product. The data may be encoded according to a variety of code formats, such as according to the Electronic Product Code (EPC) protocol, for example. In various implementations, item information may be updated. The embodiments are not limited in this context.

In various embodiments, the system 100 may comprise a reader 142. As shown in FIG. 1, for example, the reader 142 may be mounted to the carriage 130. The reader 142 may comprise multiple elements some of which may be implemented using, for example, a variety of chip architectures including one or more circuits, components, registers, processors, software subroutines, or any combination thereof. The embodiments are not limited in this context.

In various implementations, the reader 142 may comprise an RFID transceiver arranged to communicate with one or more RFID tags, such as RFID tag 140-1, for example. As used herein, the term "transceiver" may include, in a very general sense, a transmitter, a receiver, or a combination of both. The embodiments are not limited in this context.

In various embodiments, the reader 142 may comprise an integrated circuit (IC). The IC may comprise a semiconductor IC that includes a radio frequency (RF) circuit, logic, and memory. The RF circuit may comprise, for example, RF transmitter and receiver portions, each comprising a collection of discrete components such as, capacitors, transistors, and diodes that may be located on or off of the IC. Logic may comprise, for example, a processor, controller, state machine, programmable logic array, and the like, and may operate under the control of program instructions. Memory may comprise, for example, program memory, data memory or any combination thereof. Memory also may comprise, for example, RAM, ROM, PROM, EPROM, EEPROM, re-writable memory, combinations thereof, and the like. The embodiments are not limited in this context.

In various embodiments, the reader 142 may comprise an antenna connected to the IC. Examples of an antenna may include an internal antenna, an omni-directional antenna, a monopole antenna, a dipole antenna, a lead-frame antenna, an end-fed antenna, a linear polarized antenna, a circular polarized antenna, a patch antenna, a plane-inverted F antenna, a micro-strip antenna, a diversity antenna, a dual antenna, an antenna array, a helical antenna, and so forth. The embodiments are not limited in this context.

In various embodiments, the reader 142 may communicate with the RFID tag 140-1 over an RF communication channel. For example, the reader 142 may send a request for item information to the RFID tag 140-1 over an RF communication channel, and the RFID tag 140-1 may transmit item identification to the reader 142 over an RF communication channel. The embodiments are not limited in this context.

In various implementations, the system 100 may obtain information associated with the load 102, such as item information contained in RFID tag 140-1, for example. In various embodiments, the reader 142 may interrogate the RFID tag 140-1 by outputting an RF interrogation signal. For example, the reader 142 may comprise an RF circuit for transmitting an RF interrogation signal from an antenna according to logic stored within memory. The RF interrogation signal may comprise a request for item information. In some implementations, the RF interrogation signal may be transmitted at predetermined intervals. The embodiments are not limited in this context.

In various implementations embodiments, the RFID tag 140-1 may be operable to respond to an interrogating RF signal. In various embodiments, the RFID tag 140-1 may respond by transmitting item information to the reader 142. For example, in response to an RF interrogation signal received at an antenna by the RFID tag 140-1, logic stored within memory may cause the RFID tag 140-1 to transmit item information to the reader 142. The embodiments are not limited in this context.

In various embodiments, the system 100 may comprise one or more antennas, such as first antenna 144 and second antenna 146, for example. As shown in FIG. 1, for example, the first antenna 144 and the second antenna 146 may be mounted to the carriage 130 on the rotating arm 120. As described above, the carriage 130 may rotate around the load 102 and may move vertically along the rotating arm 120. Accordingly, in various implementations, the first antenna 144 and the second antenna 146 may be arranged to rotate around the load 102 and may move vertically with respect to the load 102. The embodiments are not limited in this context.

In various embodiments, the first antenna 144 and the second antenna 146 may comprise an RFID antenna such a linear polarized RFID antenna or a circular polarized RFID antenna. Other examples of an antenna may include an internal antenna, an omni-directional antenna, a monopole antenna, a dipole antenna, an end fed antenna, a micro-strip antenna, a diversity antenna, a dual antenna, an antenna array, a helical antenna, and so forth. The embodiments are not limited in this context.

In various embodiments, the first antenna 144 and the second antenna 146 may be arranged to communicate with the reader 142. For example, the reader 142 may be calibrated and tuned to communicate with the first antenna 144 and the second antenna 146. In various implementations, the reader 142 may be synchronized to transmit requests (e.g., RF interrogation signals) through the first antenna 144 and the second antenna 146 to one or more RFID tags, such as RFID tag 140-1. The first antenna 144 and the second antenna 146 may read item information (e.g., RFID data according to EPC protocol) from the one or more RFID tags, such as RFID tag 140-1, and relay the item information to the reader 142. The embodiments are not limited in this context.

In various embodiments, the first antenna 144 and the second antenna 146 may be arranged to read and communicate information at different orientations. As shown in FIG. 1, for example, the first antenna 144 may be arranged at a vertical orientation and the second antenna 146 may be arranged at a horizontal orientation. In various implementations, arranging the first antenna 144 and the second antenna 146 at different (e.g., orthogonal) orientations may improve the reading and communicating of information associated with the load 102. The embodiments are not limited in this context.

In various embodiments, the system 100 may comprise a wireless networking device 148. The wireless networking device 148 may comprise, for example, a wireless bridge, a wireless router, a wireless access point, or other wireless networking device. In various implementations, the wireless networking device 148 may be arranged to communicate with and connect the reader 142 to one or more computing devices through a wireless network connection. As shown in FIG. 1, for example, the wireless networking device 148 may be mounted to the carriage 130. The embodiments are not limited in this context.

In various embodiments, the system 100 may comprise a power supply 150. As shown in FIG. 1, for example, the power supply 150 may be mounted to the carriage 130. In various implementations, the power supply 150 may couple power from the power source 126 of the packaging system 100 to the reader 142 and to the wireless networking device 148. For example, in one embodiment, the power supply 150 may couple 120 V AC power from the 400 V AC power provided by the power source 126. The embodiments are not limited in this context.

Figure 2:
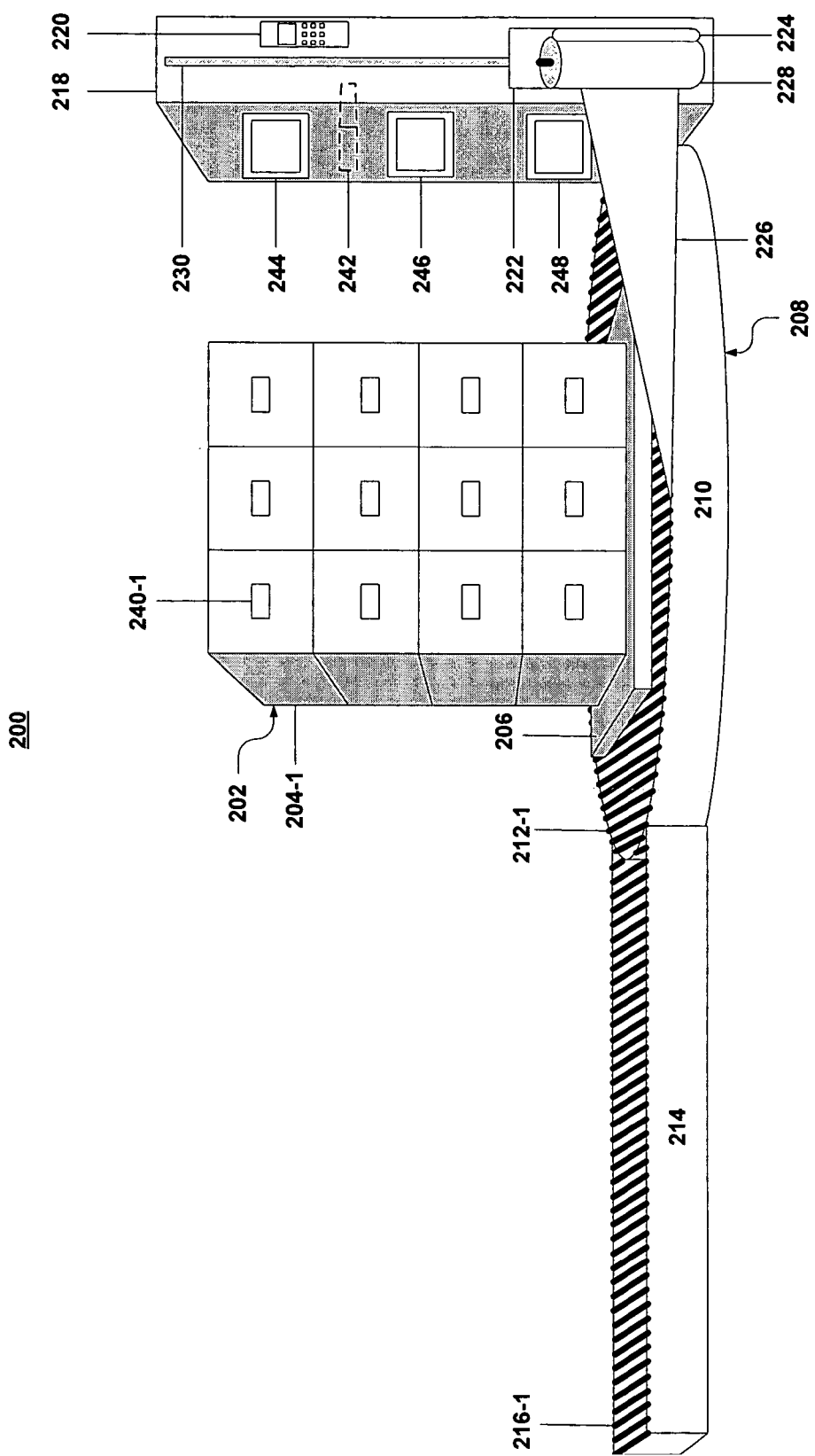
FIG. 2 illustrates a system in accordance with one embodiment.

FIG. 2 illustrates a block diagram of a system 200. In various embodiments, the system 200 may comprise a packaging system arranged to wrap a load with packaging material. In various implementations, the system 200 may comprise a semi-automatic packaging system requiring one or more manual operations, such as attaching packaging material to the load, or may comprise an automatic packaging system requiring no manual packaging operations. The embodiments are not limited in this context.

In various embodiments, the system 200 may package a load 202 comprising one or more items, such as item 204-1. In some implementations, one or more items, such as item 204-1, may be positioned on a pallet 206. The embodiments are not limited in this context.

In various embodiments, the system 200 may comprise a rotating member 208. As shown in FIG. 2, for example, the rotating member 208 may comprise a rotating platform 210. In various implementations, the rotating member 208 may be arranged to rotate the load 202. For example, the rotating member 208 may comprise a motor arranged to drive the rotating platform 210. The rotating platform 210 may rotate the load 202 in a clockwise direction or in a counter-clockwise direction. The embodiments are not limited in this context.

In various embodiments, the rotating platform 210 may comprise one or more rollers, such as roller 212-1, arranged to facilitate positioning of the pallet 206 on the rotating platform 210. The system 200 also may comprise a conveyor 214. As shown in FIG. 2, for example, the conveyor 214 may be attached to the rotating member 208. The conveyor may comprise one or more rollers, such as roller 216-1 arranged to facilitate positioning of the pallet 206 from the conveyor 214 to the rotating platform 210. The embodiments are not limited in this context.

In various embodiments, the system 200 may comprise a tower 218. As shown, in FIG. 2, for example, the tower 218 may be arranged in proximity to the rotating member 208. The embodiments are not limited in this context.

In various embodiments, the system 200 may comprise a controller 220. As shown, in FIG. 2, for example, a controller 220 may be arranged on the tower 218. The controller 220 may comprise any physical or logical entity for communicating information in the system 200 and may be implemented as hardware, software, or any combination thereof, as desired for a given set of design parameters or performance constraints. In various implementations, the controller 220 may be arranged to direct the operations of the rotating member 208. The embodiments are not limited in this context.

In various implementations, the tower 218 may comprise a carriage 222 having a dispenser 224. As shown in FIG. 2, for example, the dispenser 224 may be mounted to the carriage 222 and may be arranged to dispense packaging material 226 from a roll 228. The carriage 222 may be arranged to move in a vertical direction with respect to the load 202 by engaging a slot 230 in the tower 218. The embodiments are not limited in this context.

In various implementations, the packaging material 226 may be attached to the rotating platform 210 or to the load 202. As the rotating platform 210 rotates the load 202, the dispenser 224 may feed packaging material 226 to wrap the load 202. The carriage 222 also may move vertically along the tower 218 to wrap upper portions of the load 202. The embodiments are not limited in this context.

In various embodiments, the system 200 may comprise a communication system arranged to communicate information associated with the load 202. The communication system may be implemented as a wired communication system, a wireless communication system, or a combination of both.

In various embodiments, the system 200 may comprise one or more RFID tags, such as RFID tag 240-1, for example. As shown in FIG. 1, the RFID tag 240-1 may be associated with one or more items, such as item 204-1. The RFID tag 240-1 may be affixed to, embedded within, or form an integral part of the item 204-1. In various implementations, the RFID tag 240-1 may comprise item information. For example, the RFID tag 240-1 may store item information in memory. The embodiments are not limited in this context.

In various embodiments, the system 200 may comprise a reader 242. As shown in FIG. 1, for example, the reader 242 may be arranged on or within the tower 218. The reader 242 may comprise multiple elements some of which may be implemented using, for example, a variety of chip architectures including one or more circuits, components, registers, processors, software subroutines, or any combination thereof. In various implementations, the reader 242 may comprise an RFID transceiver arranged to communicate with one or more RFID tags, such as RFID tag 240-1, for example. The embodiments are not limited in this context.

In various implementations, the system 200 may obtain information associated with the load 202, such as item information contained in RFID tag 240-1, for example. In various embodiments, the reader 242 may communicate with the RFID tag 240-1 over an RF communication channel. For example, the reader 242 may send a request for item information to the RFID tag 240-1 over an RF communication channel, and the RFID tag 240-1 may transmit item identification to the reader 242 over an RF communication channel. The embodiments are not limited in this context.

In various embodiments, the system 200 may comprise one or more antennas, such as first antenna 244, second antenna 246, and third antenna 248, for example. As shown in FIG. 2, for example, the first antenna 244, the second antenna 246, and the third antenna 248 may be mounted to the tower 218. Although a first antenna 244, a second antenna 246, and a third antenna 248 are shown in various embodiments, more or less antennas may be employed for a given implementation. The embodiments are not limited in this context.

In various embodiments, the first antenna 244, the second antenna 246, and the third antenna 248 may comprise an RFID antenna such a linear polarized RFID antenna or a circular polarized RFID antenna. Other examples of an antenna may include an internal antenna, an omni-directional antenna, a monopole antenna, a dipole antenna, an end fed antenna, a micro-strip antenna, a diversity antenna, a dual antenna, an antenna array, a helical antenna, and so forth. The embodiments are not limited in this context.

In various embodiments, the first antenna 244, the second antenna 246, and the third antenna 248 may be arranged to communicate with the reader 242. For example, the reader 242 may be calibrated and tuned to communicate with the first antenna 244, the second antenna 246, and the third antenna 248. In various implementations, the reader 242 may be synchronized to transmit requests (e.g., RF interrogation signals) through the first antenna 244, the second antenna 246, and the third antenna 248 to one or more RFID tags, such as RFID tag 240-1. The first antenna 244, the second antenna 246, and the third antenna 248 may read item information (e.g., RFID data according to EPC protocol) from the one or more RFID tags, such as RFID tag 240-1, and relay the item information to the reader 242. The embodiments are not limited in this context.

Figure 3:
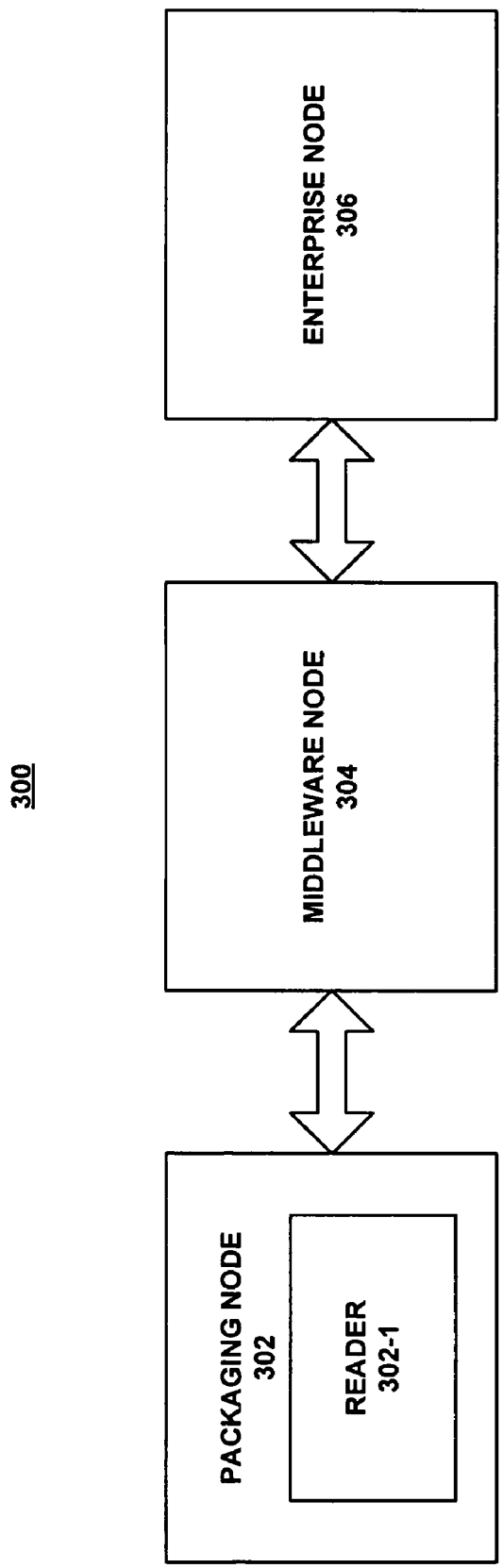
FIG. 3 illustrates a system in accordance with one embodiment.

FIG. 3 illustrates a block diagram of a system 300. In one embodiment, for example, the system 300 may comprise a communication system having multiple nodes. A node may comprise any physical or logical entity for communicating information in the system 300 and may be implemented as hardware, software, or any combination thereof, as desired for a given set of design parameters or performance constraints. Although FIG. 3 may show a limited number of nodes by way of example, it can be appreciated that more or less nodes may be employed for a given implementation. The embodiments are not limited in this context.

In various embodiments, a node may comprise, or be implemented as, a computer system, a computer sub-system, a computer, a workstation, a terminal, a server, a personal computer (PC), a laptop, an ultra-laptop, a handheld computer, a personal digital assistant (PDA), a set top box (STB), a telephone, a cellular telephone, a handset, an interface, an input/output (I/O) device (e.g., keyboard, mouse, display, printer), a router, a hub, a gateway, a bridge, a switch, a microprocessor, an integrated circuit, a programmable logic device (PLD), a digital signal processor (DSP), a processor, a circuit, a logic gate, a register, a microprocessor, an integrated circuit, a semiconductor device, a chip, a transistor, or any other device, machine, tool, equipment, component, or combination thereof. The embodiments are not limited in this context.

In various embodiments, a node may comprise, or be implemented as, software, a software module, an application, a program, a subroutine, an instruction set, computing code, words, values, symbols or combination thereof. A node may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, microcode for a network processor, and so forth. The embodiments are not limited in this context.

In various embodiments, the system 300 may be implemented as a wired communication system, a wireless communication system, or a combination of both. When implemented as a wireless system, for example, a system may include one or more wireless nodes arranged to communicate information over one or more types of wireless communication media. An example of a wireless communication media may include portions of a wireless spectrum, such as the radio-frequency (RF) spectrum radio frequencies (RF) and so forth. The wireless nodes may include components and interfaces suitable for communicating information signals over the designated wireless spectrum, such as one or more antennas, wireless transmitters/receivers ("transceivers"), amplifiers, filters, control logic, and so forth.

When implemented as a wired system, for example, a system may include one or more nodes arranged to communicate information over one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

In various embodiments, the nodes of system 300 may be arranged to perform one or more processing operations. Processing operations may generally refer to one or more operations, such as generating, managing, communicating, sending, receiving, storing, forwarding, accessing, reading, writing, manipulating, transforming, encoding, decoding, compressing, decompressing, encrypting, filtering, monitoring, tracking, or other processing of information. In various implementations, the nodes of system 300 may perform processing operations in accordance with one or more protocols. A protocol may comprise a set of predefined rules or instructions for managing communication among nodes, such as the Transport Control Protocol (TCP) and Internet Protocol (IP), for example. The embodiments are not limited in this context.

As shown in FIG. 3, the system 300 may comprise a packaging node 302. In various embodiments, the packaging node 302 may comprise a packaging system such as system 100 or system 200. The embodiments are not limited in this context.

In various embodiments, the packaging node 302 may comprise multiple elements, such as element 302-1. Although FIG. 1 shows a limited number of elements by way of example, it can be appreciated that more or less elements may be used for a given implementation. The embodiments are not limited in this context.

Element 302-1 may comprise, or be implemented as, one or more systems, sub-systems, processors, devices, machines, tools, components, circuits, registers, modules, applications, programs, subroutines, or any combination thereof, as desired for a given set of design or performance constraints. In various embodiments, element 302-1 may be connected by one or more communications media. Communications media generally may comprise any medium capable of carrying information signals. For example, communication media may comprise wired communication media, wireless communication media, or a combination of both, as desired for a given implementation. The terms "connection" or "interconnection," and variations thereof, in this context may refer to physical connections and/or logical connections. The embodiments are not limited in this context.

In various embodiments, the packaging node 302 may comprise a reader 302-1. In various implementations, the reader may read item information associated with a load. The reader 302-1 may comprise an RFID reader arranged to read item information from one or more RFID tags, for example. The embodiments are not limited in this context.

In various implementations, the reader 302-1 may be arranged to read item information during the rotation of a rotating member. In one embodiment, the rotating member may comprise a rotating arm arranged to rotate around a load. In another embodiment, the rotating member may comprise a rotating platform arranged to rotate a load. The rotating member may provide relative rotation between a load and a packaging material dispenser. The embodiments are not limited in this context.

In various embodiments, the system 300 may comprise a middleware node 304. As shown in FIG. 3, for example, the middleware node 304 may be arranged to connect the packaging node 302 with an enterprise node 306. In various implementations, the middleware node 304 may receive and process item information from the packaging node 302. For example, the middleware node 304 may be arranged to configure and/or manage one or more readers, such as reader 302-1. The embodiments are not limited in this context.

In various implementations, the middleware node 304 may filter item information received from the packaging node 302. For example, the middleware node 304 may parse, aggregate, compile, balance, process, and/or manage item information. The middleware node 304 may route item information to one or more destinations, such as the enterprise node 306. For example, the middleware node 304 may establish a connection to and/or integrate with a destination, such as enterprise node 306. The embodiments are not limited in this context.

In various embodiments, the enterprise node 306 may be arranged receive and process item information related to a particular enterprise. For example, the enterprise node 306 may be configured to monitor and/or track item information related to one or more of ordering, purchasing, manufacturing, producing, packaging, distributing, scheduling, shipping, receiving, forecasting, and stocking. The embodiments are not limited in this context.

Operations for the above systems, nodes, apparatus, elements, and/or subsystems may be further described with reference to the following figures and accompanying examples. Some of the figures may include a method. Although such figures presented herein may include a particular method, it can be appreciated that the method merely provides an example of how the general functionality as described herein may be implemented. Further, the given method does not necessarily have to be executed in the order presented unless otherwise indicated. In addition, the given method may be implemented manually, semi-automatically, automatically, by a hardware element, by a software element executed by a processor, or any combination thereof. The embodiments are not limited in this context.

Figure 4:
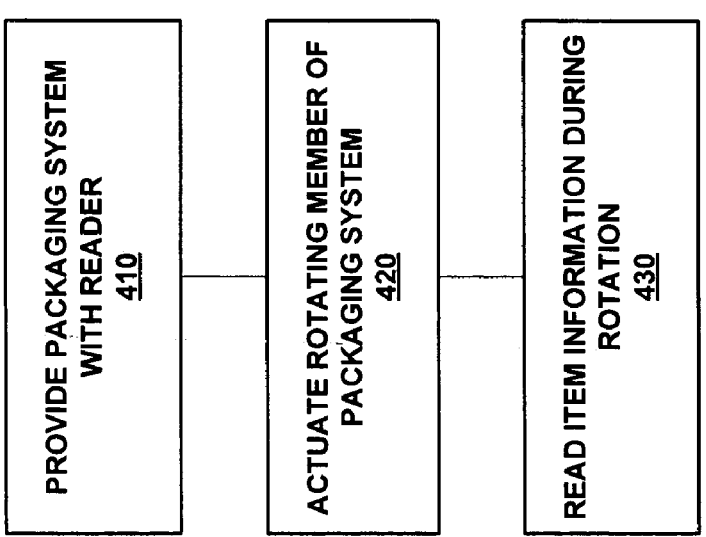
FIG. 4 illustrates a method in accordance with one embodiment.

FIG. 4 illustrates a diagram of a method 400 in accordance with one embodiment. The method 400 may be representative of the operations executed by one or more elements of system 100, system 200, or system 300. The embodiments are not limited in this context.

Method 400 may comprise providing a packaging system with a reader at block 410. In various embodiments, a packaging system arranged to wrap a load with packaging material may be provided with a reader. The reader may comprise an RFID reader arranged to read item information from one or more RFID tags, for example. The embodiments are not limited in this context.

Method 400 may comprise actuating a rotating member of the packaging system at block 420. In one embodiment, the rotating member may comprise a rotating arm arranged to rotate around a load. In another embodiment, the rotating member may comprise a rotating platform arranged to rotate a load. In various implementations, the rotating member may provide relative rotation between a load and a packaging material dispenser. The embodiments are not limited in this context.

Method 400 may comprise reading item information during rotation at block 430. In various implementations, the reader may read item information associated with a load during the rotation of the rotating member. In one embodiment, the reader may read item information during the rotation of a rotating arm. In another embodiment, the reader may read item information during the rotation of a rotating platform. In various implementations, the reading of item information may occur while the rotating member provides relative rotation between a load and a packaging material dispenser. The embodiments are not limited in this context.

As described herein, various embodiments and implementations may allow virtually simultaneous and instantaneous reading of item information during packaging operations. Accordingly, such embodiments and implementations may improve the reading and processing of item information. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Although a system may be illustrated using a particular communications media by way of example, it may be appreciated that the principles and techniques discussed herein may be implemented using any type of communication media and accompanying technology.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. A packaging system, comprising:
a rotating member to rotate during packaging of a load, said rotating member comprising a rotating arm, and a reader to read item information associated with said load during rotation of said rotating member.

2. The packaging system of claim 1, wherein said reader is mounted to said rotating member.

3. The packaging system of claim 1, wherein said reader comprises a radio frequency identification reader.

4. The packaging system of claim 1, wherein said load comprises one or more radio frequency identification tags.

5. The packaging system of claim 1, further comprising at least one antenna to relay item information to said reader.

6. The packaging system of claim 1, further comprising at least one antenna mounted to said rotating member.

7. The packaging system of claim 6, further comprising a first antenna mounted to said rotating member at a first orientation and a second antenna mounted to said rotating member at a second orientation.

8. The packaging system of claim 1, further comprising a power supply for said reader coupled to a power source for said rotating member.

9. The packaging system of claim 1, further comprising a wireless network device in communication with said reader.

10. A system comprising:
a packaging node to package a load, said packaging node comprising:
a rotating member to rotate during packaging of said load, said rotating member comprising a rotating arm;
a reader to read item information associated with said load during rotation of said rotating member; and
a middleware node to receive said item information from said packaging node.

11. The system of claim 10, wherein said middleware node filters said item information.

12. The system of method of claim 10, further comprising an enterprise node to receive item information from said middleware node.

13. A method comprising:
providing a packaging system with a reader;
actuating a rotating member of said packaging system, said rotating member comprising a rotating arm; and
reading item information associated with items being packaged by said packaging system during rotation of said rotating member.

14. The method claim 13, wherein said reader comprises a radio frequency identification reader.

* * * * *